(12) United States Patent
De Schrijver et al.

(10) Patent No.: US 11,347,600 B2
(45) Date of Patent: May 31, 2022

(54) DATABASE TRANSACTION LOG MIGRATION

(71) Applicant: Western Digital Technologies, Inc., San Jose, CA (US)

(72) Inventors: Frederik Jacqueline Luc De Schrijver, Wenduine (BE); Joris Custers, Ghent (BE); Carl Rene D'Halluin, Zwijnaarde (BE)

(73) Assignee: Western Digital Technologies, Inc., San Jose, CA (US)

( * ) Notice: Subject to any disclaimer, the term of this patent is extended or adjusted under 35 U.S.C. 154(b) by 256 days.

(21) Appl. No.: 15/701,483

(22) Filed: Sep. 12, 2017

(65) Prior Publication Data

US 2019/0079834 A1 Mar. 14, 2019

(51) Int. Cl.

| G06F 11/14 | (2006.01) |
| G06F 9/46 | (2006.01) |
| G06F 12/0875 | (2016.01) |
| G06F 16/23 | (2019.01) |
| G06F 16/27 | (2019.01) |
| G06F 11/16 | (2006.01) |

(52) U.S. Cl.
CPC .......... *G06F 11/1474* (2013.01); *G06F 9/466* (2013.01); *G06F 12/0875* (2013.01); *G06F 16/2308* (2019.01); *G06F 16/2358* (2019.01); *G06F 16/27* (2019.01); *G06F 11/1479* (2013.01); *G06F 11/1658* (2013.01); *G06F 2212/1032* (2013.01)

(58) Field of Classification Search
None
See application file for complete search history.

(56) References Cited

U.S. PATENT DOCUMENTS

| 7,152,181 | B2 | 12/2006 | Fung et al. | |
| 7,406,487 | B1 | 7/2008 | Gupta et al. | |
| 8,321,667 | B2 | 11/2012 | Bradshaw et al. | |
| 8,661,068 | B1 * | 2/2014 | Seibel | G06F 16/172 |
| | | | | 707/825 |
| 8,751,449 | B2 | 6/2014 | Carmichael | |
| 9,396,131 | B1 * | 7/2016 | Hendry | G06F 12/121 |
| 10,461,991 | B1 * | 10/2019 | Morley | H04L 67/104 |

(Continued)

OTHER PUBLICATIONS

Tomas Talius; Transaction Log Based Application Error Recovery and Point In-Time Query; 2012;Proceedings of teh VLDB Endowment, vol. 5, No. 12; pp. 1781-1789 (Year: 2012).*

(Continued)

*Primary Examiner* — Albert M Phillips, III
*Assistant Examiner* — Jermaine A Mincey
(74) *Attorney, Agent, or Firm* — Patent Law Works LLP

(57) ABSTRACT

A system, method and apparatus for storing metadata in a metadata store in a robust and efficient manner including receiving a request from a client to perform a data transaction, updating a key-value pair in a metadata store based on the request, entering the data transaction in a transaction log, replicating the last transaction log entry in at least one other storage node in the metadata store and, in response to a threshold event, migrating a first portion of the transaction log from the a data storage medium to a second data storage medium of each of the plurality of data storage nodes.

20 Claims, 7 Drawing Sheets

(56) References Cited

U.S. PATENT DOCUMENTS

| | | | | |
|---|---|---|---|---|
| 2013/0268734 | A1* | 10/2013 | Hotz | G06F 16/172 |
| | | | | 711/133 |
| 2014/0208001 | A1* | 7/2014 | Liu | G06F 11/1471 |
| | | | | 711/103 |
| 2014/0258628 | A1 | 9/2014 | Shivashankaraiah et al. | |
| 2015/0112929 | A1 | 4/2015 | Quakkelaar et al. | |
| 2017/0344478 | A1* | 11/2017 | Feng | G06F 11/1474 |
| 2019/0065322 | A1* | 2/2019 | Chakankar | G06F 11/1451 |

OTHER PUBLICATIONS

"SnapManager Overview," Aug. 2013, retrieved from: https://library.netapp.com/ecmdocs/ECMP1217281/html/GUID-650FC210-3755-449B-9E5E-643BA65C61A4.html (2 pages).

"Performing Transaction Log Backups using AlwaysOn Availability Group Reading-Only Secondary Replicas—Part 1," dated Sep. 27, 2013, retrieved from: https://blogs.msdn.microsoft.com/alwaysonpro/2013/09/27/performing-transaction-log-backups-using-alwayson-availability-group-read-only-secondary-replicas-part-1/ (9 pages).

* cited by examiner

DATABASE TRANSACTION LOG MIGRATION

BACKGROUND

The present disclosure relates generally to managing transaction logs and read caches in a database. In particular, the present disclosure relates to efficiently managing, duplicating, and migrating transaction log and read cache data in a key-value store.

Metadata stores are one example of a key-value store that store structural or descriptive information about other data (e.g., data stored in a large scale distributed storage system). In computer data storage systems, particularly large scale distributed storage systems, the metadata stored in a metadata store may contain information about the location or description of data stored in large scale distributed storage system. Metadata is important in data storage systems for locating and maintaining data stored in the data storage system.

Further, if a storage node or storage device of a metadata store fails, the metadata including difficult-to-recreate transactions may be permanently lost. Storing the metadata redundantly on multiple data storage nodes in a metadata store can aid in protecting against data loss due to storage device failure. This redundant storage, however, consumes extra processing and storage resources.

For a large scale distributed storage system, maintaining a transaction log of client interactions with data stored in the system aids in recreating the current state, or a prior state, of the metadata. However, maintaining the transaction logs for a highly accessed large scale distributed storage system consumes extra processing and storage resources. Further, replaying the transaction logs to recreate a current or prior state of the metadata can be slow and consume additional processing resources.

Further, maintaining the metadata can consume valuable processing and storage resources, especially when considering the scale of today's storage system. For instance, to allow users and administrators to better understand and manage their data files, a large amount of metadata, and thus storage resources, may be necessary to provide for effective searches over the metadata. With increased scale and storage resources consumed by metadata, time to access the metadata store for processing metadata queries and searches is unavoidably increased.

SUMMARY

In view of the problems associated with managing large databases, such as key-value stores, in a storage system, one object of the present disclosure is to provide a highly accessible read cache for the database. This provides for quickly assessing the current status of the database. The read cache may be created based on transaction log entries. To provide a failsafe recovery mechanism, the created read cache may be duplicated to a separate node in the storage system.

Another object of the present disclosure is to migrate some information, such as transaction log data, from a local, fast access storage system to a more robust and cost-effective system, such as an additional secondary storage system, or even a distributed storage system. This migration minimizes the amount of data on fast, local storage for more efficient accessing and processing without affecting the primary functions of the database.

Still another object of the present disclosure is to generate a snapshot for a read cache. By generating a snapshot of a read cache, the covered transaction log may be intentionally deleted to save storage space in the storage system. In case of a read cache failure, instead of using the whole transaction log, a snapshot of read cache may be used to replace the covered transaction log entries in replaying the read cache. Through this approach, a potential large amount of storage may be saved.

These and other objects of the present disclosure may be implemented in a metadata store, that is further described below with a brief description of example system components and steps to accomplish the above and other objects for efficiently accessing and processing metadata. However, the techniques introduced herein may be implemented with various storage system structures database content.

The techniques introduced herein may include a method including: receiving a request from a client to perform a data transaction, updating a key-value pair in a metadata store based on the request, entering the data transaction in a transaction log, updating a read cache with the key-value pair, and replicating the last transaction log entry in at least one other storage node in the metadata store. Other aspects include corresponding computer systems, apparatus, and computer programs recorded on one or more computer storage devices, each configured to perform the actions of the methods.

The techniques introduced herein may further include one or more of the following features. The method where the data transaction includes storing, retrieving, updating, or deleting a data object. The method further includes copying a portion of the transaction log to a transaction log fragment object in a large scale distributed storage system. The method where replicating the last transaction log entry includes copying a portion of the last transaction log entry to at least one other storage node such that if one storage node fails there remains enough of the read cache on the remaining storage nodes to fully restore the read cache. The method further includes updating a read cache on a local storage device. The method further includes replicating the read cache on at least one additional local storage device. The method where the at least one additional local storage device includes solid-state drives. The method where replicating the read cache includes copying a portion of the read cache to the local storage devices such that if one local storage device fails there remains on the other local storage devices enough of the read cache to fully restore the read cache. The method where the last transaction log entry is stored on a local storage device. The method where the local storage device includes a hard disk drive.

The techniques introduced herein include a system having: a communication bus; a network interface module communicatively coupled to the communication bus; a storage interface module coupled to a storage device, the storage interface module communicatively coupled to the communication bus; a processor; and a memory module communicatively coupled to the communication bus, the memory module including instructions that when executed by the processor causes the system to receive a request from a client to perform a data transaction. The instructions further cause the processor to update a key-value pair in a metadata store based on the request. The instructions may also cause the processor to enter the data transaction in a transaction log. The instructions further cause the processor to update a read cache with the key-value pair. The instructions also cause the processor to replicate the last transaction log entry in at least one other storage node in the metadata store.

BRIEF DESCRIPTION OF THE DRAWINGS

The techniques introduced in the present disclosure are illustrated by way of example, and not by way of limitation in the figures of the accompanying drawings in which like reference numerals are used to refer to similar elements.

DETAILED DESCRIPTION

For purposes of illustration, the techniques described herein are presented within the context of metadata stores. In particular, the techniques described herein make reference to metadata stores for a large scale distributed storage system. However, references to, and illustrations of, such environments and embodiments are strictly used as examples and are not intended to limit the mechanisms described to the specific examples provided. Indeed, the techniques described are equally applicable to any database using a transaction-like replication mechanism, or any system with state transactions and an associated read cache.

According to the techniques disclosed herein, a read cache comprises the current state of the metadata store. Maintaining a highly accessible read cache can make accessing the current state of the metadata much faster and more efficient than replaying the transaction log. A loss of the read cache due to storage device or node failure, or some other cause of data corruption or loss, could require the replaying of the transaction log from the beginning, or from some other known state in order to recreate the current state of the metadata. Duplicating the metadata read cache across multiple data storage nodes can mitigate the risk of loss of the current state of the metadata at the cost of additional processing and storage resources.

Figure 1:
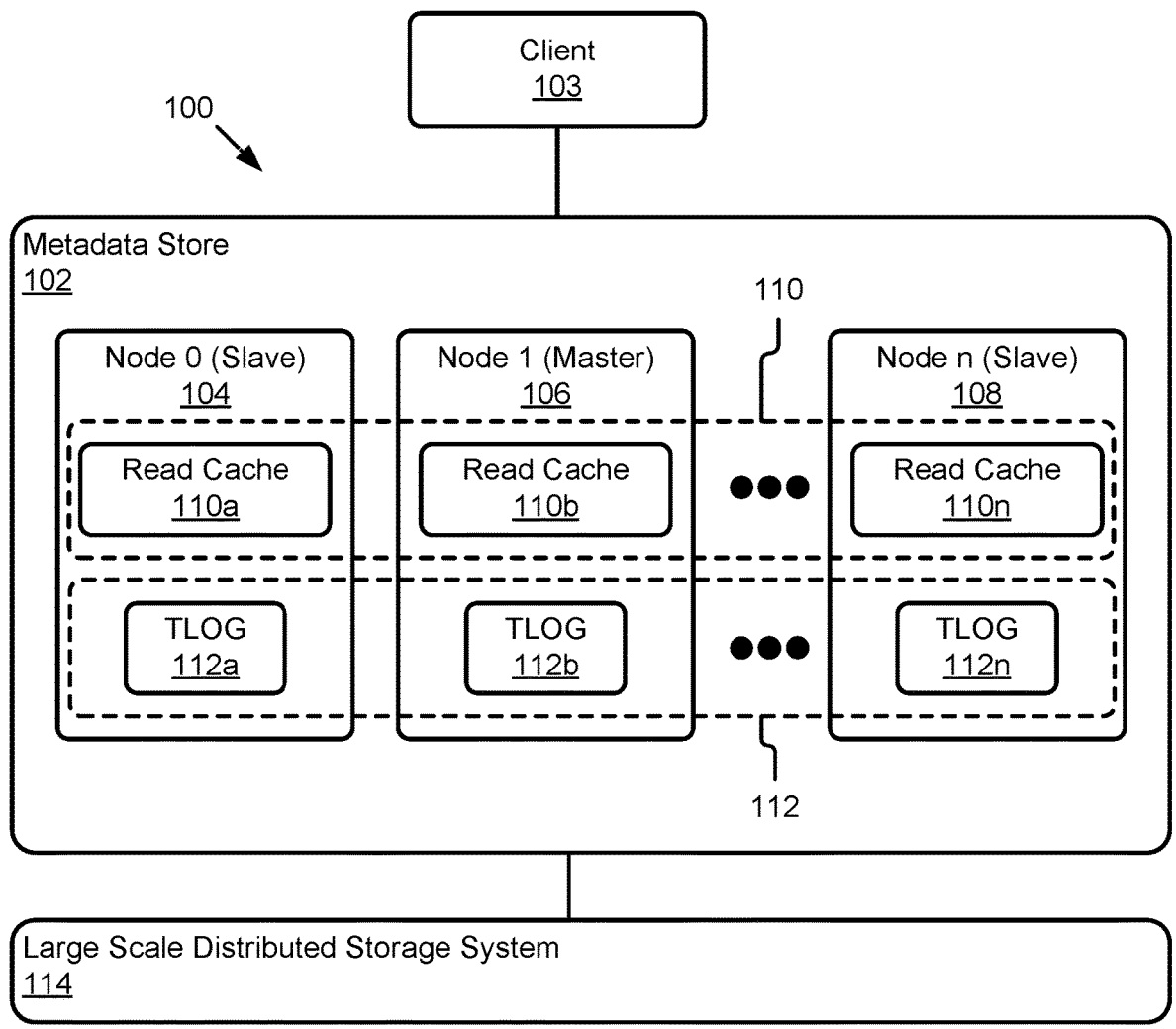
FIG. 1 is a block diagram illustrating an example of a multi-node metadata store with a transaction log.

FIG. 1 is a block diagram illustrating an example of a multi-node metadata store 102 coupled with a large scale distributed storage system 114. The metadata store 102 may be accessed by a client 103. The metadata store comprises a read cache 110 and a transaction log ("TLOG") 112. In the example of FIG. 1, the metadata store comprises at least three storage nodes 104, 106, and 108. However, there may be more than three data storage nodes as indicated by the ellipses between "node 1" 106 and "node n" 108. The read cache 110a, 110b, and 110n (also referred to herein individually and collectively as read cache 110) caches the current state of the metadata. In the example of FIG. 1, 110n denotes the $n^{th}$ copy of the read cache—corresponding to the $n^{th}$ storage node. The number of nodes "n" may be any number greater than or equal to two. The TLOG 112a, 112b, and 112n (also referred to herein individually and collectively as TLOG 112) stores metadata associated with client storage requests. Each storage request from the client 103 is logged in the TLOG 112. The TLOG 112 thus comprises the sequence of storage requests made to the large scale distributed storage system 114. This TLOG 112 provides a failsafe recovery mechanism as the TLOG 112 can be replayed in order to determine the most current state of the metadata store 102. The metadata store 102 interfaces with and is communicatively coupled to a large scale distributed storage system 114. The large scale distributed storage system 114 stores data objects and the records in the metadata store 102 include a mapping of object identifiers (IDs) to respective object locations in the large scale distributed storage system 114.

In one embodiment, the metadata store 102 is a key value store in which, for every key of a data object, data for retrieval of the data object are stored. The key may be the name, object ID, or other identifier of the data object, and the data may be a list of the storage nodes on which redundantly encoded sub blocks of the data object are stored and available. It should be apparent that other database structures (e.g., a relational database) may be used to implement the metadata store.

The metadata store 102 may be replicated on a group of storage nodes. In one embodiment, as depicted in the example of FIG. 1, three storage nodes 104, 106, and 108 cooperate in a majority vote configuration such as Paxos. A sharded version of such a metadata store could be distributed among a plurality of such node clusters.

As provided by the techniques introduced herein, the costs of data loss may be mitigated by only duplicating the TLOG 112 or read cache 110 across some of the available nodes in the metadata store 102. For example, the TLOG 112 and read cache 110 may be duplicated across a majority of the data storage nodes in the metadata store 102. In one embodiment, the speed of access to the read cache 110 and the most relevant portion of the TLOG 112 can be addressed by storing the read cache 110 and the tail (e.g., the most recent portion) of the TLOG 112 on fast storage. For example, the nodes of the metadata store 102 may include fast, but perhaps expensive and less-durable, local solid-state drives ("SSDs") for storing the read cache 110 and portions of the TLOG 112. Solid-state drives can provide faster data access relative to spinning platter hard disk drives. However, some SSDs operate such that each storage location has a relatively limited number of write-cycles before that location on the SSD wears out.

In one embodiment, when there are three nodes in the metadata store as in the example of FIG. 1, the read cache 110 is only duplicated on a majority of the data storage nodes in the metadata store 102, such as node 0 104 and node 1 106, and the read cache 110 is not duplicated on additional nodes, such as node n 108. By occasionally rotating which nodes contain copies of the read cache 110, the wear across the fast, local drives in the metadata store 102 is spread more evenly across the drives in the array. By only writing the read cache 110 to a subset of the nodes, such as nodes 104 and 106, the number of write operations to the fast, local storage such as an SSD is reduced by as much as one third and can thus prolong the life of the array of fast, local storage (which may be SSDs) in the metadata store 102. The reduced number of read caches is still able to meet the consensus requirement for the majority voting algorithm of a Paxos cluster, for example, and so the consistency of the read cache 110 in the nodes 104, 106 and 108 is guaranteed. In one embodiment, where the time to rebuild the read cache 110 by replaying the TLOG 112 is sufficiently low, even a single copy of the read cache (e.g., read cache 110*a*) on a single node of the cluster could suffice to satisfy the quorum. If the single copy of the read cache 110 were to fail, the read cache 110 could be restored on a still-functioning node of the cluster by replaying the TLOG 112 on the still-functioning node.

While node 1 106 is labeled as the master node in FIG. 1, it should be noted that a master node is not necessarily always linked to node 1 106. A master node is dynamic and can be taken over by any other node in the system 100 if that node satisfies the requirements to become a master node and the majority of the nodes in the system 100 agree that node to become a master node.

Figure 2:
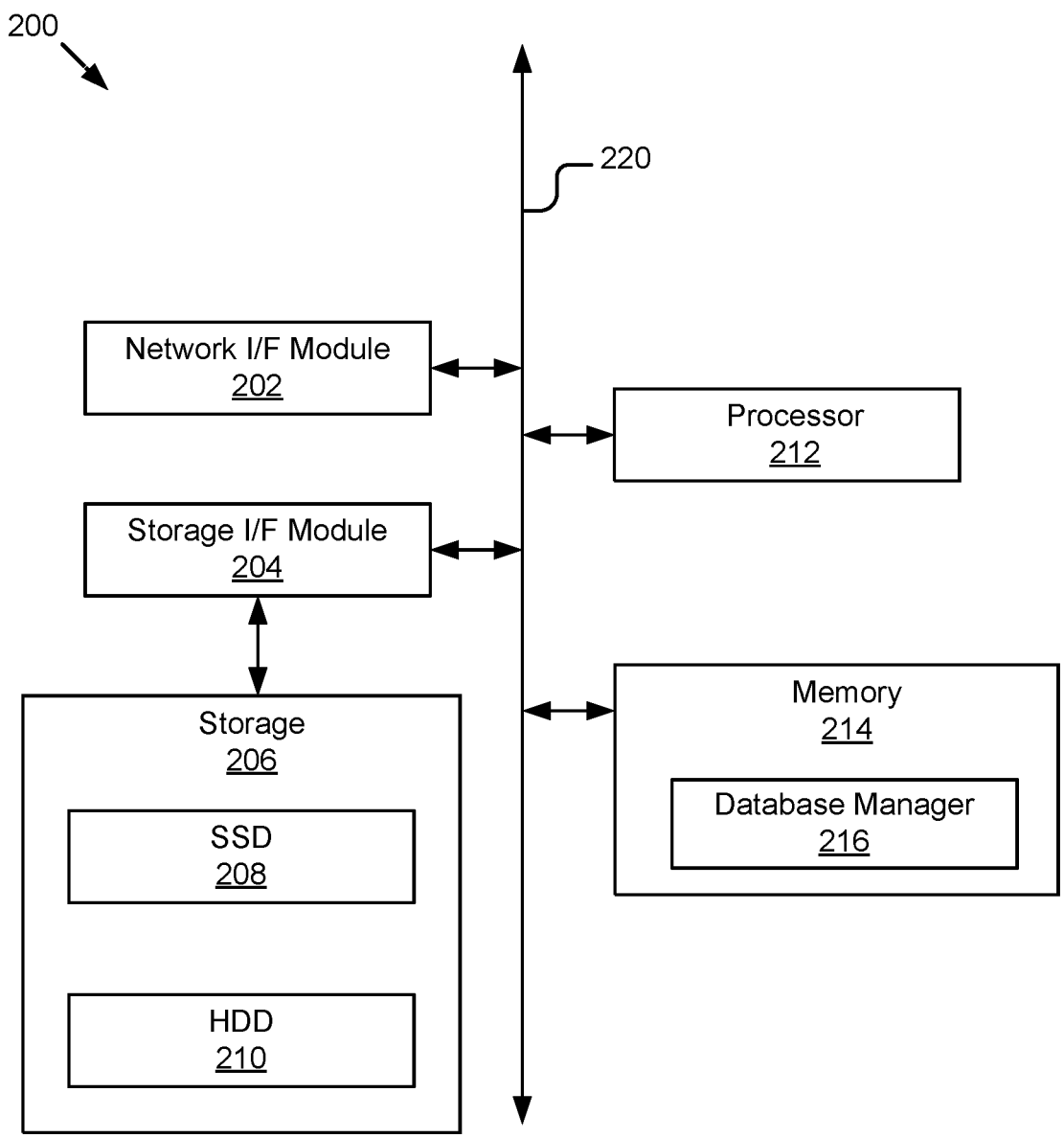
FIG. 2 is a block diagram illustrating an example of a data storage device capable of storing metadata and a transaction log.

FIG. 2 illustrates an example of a computing device 200 capable of storing metadata and a transaction log for use as a node in a metadata store, for example. The illustrated computing device 200 enables the software and hardware modules of the device to communicate with each other and store and execute data and code. The computing device 200 comprises a central data bus 220. A network interface module 202 connects to the central data bus 220 and allows other computing devices (e.g., the client 103) to interact with the computing device 200. The storage interface module 204 allows the computing system 200 to communicate with storage 206. Storage 206 can be non-volatile memory or similar permanent storage device and media, for example, a floppy disk drive, a CD-ROM device, a DVD-ROM device, a DVD-RAM device, a DVD-RW device, a flash memory device, or some other mass storage device known in the art for storing information on a more permanent basis. In some embodiments, storage 206 may comprise a fast storage device 208 such as an SSD, and a more robust, larger capacity, less expensive storage device 210 such as an HDD. However, alternate embodiments may be configured to use only SSDs or only HDDs for local storage. The storage 206 may comprise other local storage device types, or even non-local, storage such as a large scale distributed storage system 114. The central data bus 220 also communicatively couples the Network interface module 202 and the storage interface module 204 to a processor 212 and memory 214. The memory 214 may comprise a database manager 216 in some embodiments.

The processor 212 can include an arithmetic logic unit, a microprocessor, a general-purpose controller or some other processor array to perform computations. The processor 212 is coupled to the central data bus 220 for communication with the other components of the system 200. Although only a single processor is shown in FIG. 2, multiple processors or processing cores may be included.

The memory 214 can store instructions and/or data that may be executed by processor 212. The memory 214 is coupled to the central data bus 220 for communication with the other components. The instructions and/or data may include code for performing the techniques described herein. The memory 214 may be a dynamic random access memory (DRAM) device, a static random access memory (SRAM) device, flash memory or some other memory device known in the art.

Figure 3:
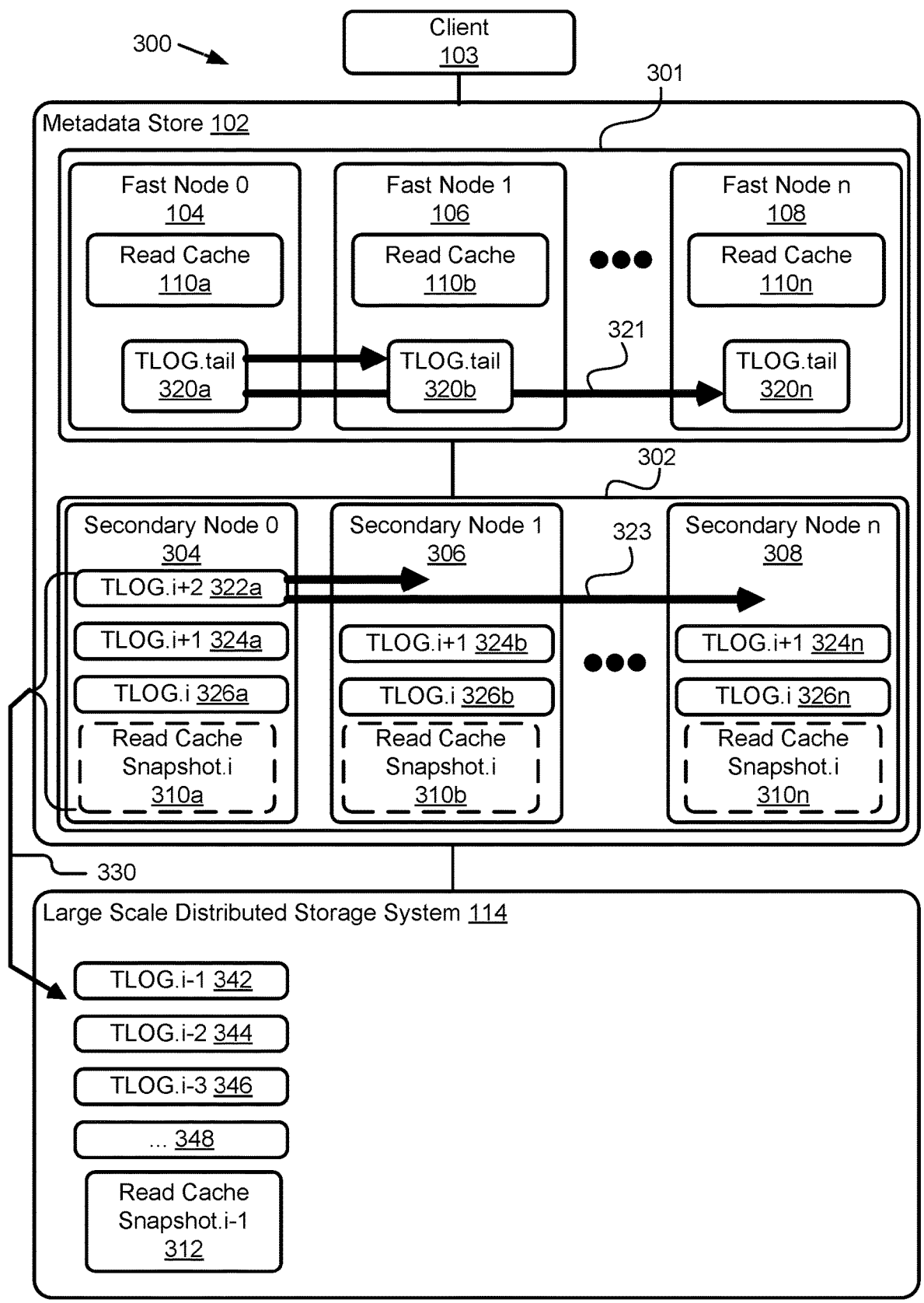
FIG. 3 is a block diagram illustrating an example of a multi-node metadata store with a read cache and part of a transaction log stored on local storage nodes and the rest of the transaction log stored on a distributed storage system.

FIG. 3 illustrates an example of a multi-node metadata store 102 with a read cache 110 and part of a transaction log 112 stored on local storage nodes and the rest of the transaction log stored on a distributed storage system. In some embodiments, the metadata store 102 comprises a fast, local storage array 301 and a more robust secondary storage array 302. The system enables robust metadata storage in an efficient manner which can reduce processing and storage requirements while providing data protection or recovery in the event of partial system failure. The system 300 comprises a metadata store 102 communicatively coupled to a large scale distributed storage system 114.

The client 103 may initiate transactions with the large scale distributed storage system 114. These transactions may alter the read cache 110*a*, 110*b*, and 110*n* (also referred to herein individually and collectively as 110). Client requests are logged in the TLOG 112. In some embodiments, the read cache 110 is stored on one or more nodes of fast local storage 301, which in some embodiments may be local SSDs. The most recent client transactions are stored in the tail of the TLOG 320*a*, 320*b*, and 320*n* (also referred to herein individually and collectively as 320). Like the read cache, the TLOG tail may be stored on a number of nodes, designated by the number "n" and duplicated to additional nodes by copying 321 the transaction log from one node to another.

Other segments of the TLOG 322, 324, and 326 (distributed across nodes a, b, n) may be stored, in some embodiments, on secondary local storage nodes 304, 306 and 308 in the secondary local storage array 302, which in some embodiments may be local HDDs. Segments of the TLOG may be copied 323 to parallel storage nodes.

Still other segments of the TLOG 342-348 may be stored as one or more data objects 340 in a large scale distributed storage system 114.

When the most recent TLOG entries in TLOG.tail 320 meet a certain threshold, they may be migrated to the secondary local storage nodes 304, 306, 308. The triggering threshold may be time-based trigger or when the TLOG.tail grows beyond a predetermined storage size—10 MB, for example. By moving the TLOG.tail to a secondary node 304, 306, 308 and designating the TLOG.tail as a new TLOG element 322*a*, an ordered sequence of TLOG files: TLOG.i+2 322*a*, TLOG.i+1 324*a*, TLOG.i 326*a*, etc., are accumulated on the secondary local storage.

In some embodiments, in response to a threshold being satisfied, the read cache may be copied as a read cache snapshot, for instance Read Cache Snapshot.i 310, to secondary local storage nodes 304, 306, and/or 308 and all other TLOG entries may be removed. Examples of such a threshold may include a time limit, a number of TLOG entries or a size threshold on the TLOG. After the read cache snapshot is created, subsequent TLOG entries may then be added to a new TLOG. Subsequently, when the read cache needs to restored, the restoration will take reduced time due to beginning with the read cache snapshot and appending the subsequent modifications from the new TLOG with a reduced size. In this embodiment, the storage capacity requirement of the secondary local storage nodes 304, 306, and 308 that hold the TLOG can be reduced.

As the limited nodes of the secondary storage of the metadata store approach capacity (or a counter or time-based threshold is used) the oldest segments of the TLOG, 326 and Read Cache Snapshot.i 310, for example, can be migrated 330 to a more robust and more cost-effective storage system such as the large scale distributed storage system 114, as illustrated. The migration 330 of the plurality of replicas of the TLOG entries 320, 322, 324, 326, and Read Cache Snapshot.i 310 in the metadata store 102 are replaced by a single entry in the large scale distributed storage system 114 which capitalizes on the robustness and efficiency of the large scale distributed storage system with its lower storage overhead and higher redundancy level. However, it is clear that alternative embodiments for a remote storage system, such as Network-Attached Storage or RAID Arrays, are also possible. In the event of a failure of an element of the metadata store, archived TLOG entries remain accessible by means of the reference to the Read Cache Snapshot.1 310a at the end of the sequence of TLOG files in the metadata store 102 or the Read Cache Snapshot.i-1 312 in the large scale distributed storage system 114.

In one embodiment, TLOG files are migrated 330 from the metadata store to the large scale distributed storage system 114 after all nodes of the metadata store are in sync for these TLOG files. For example, TLOG.i+2 322a is first synchronized to node 1 306 and all remaining nodes before the migration to the large scale distributed storage system 114 can take place.

Figure 4:
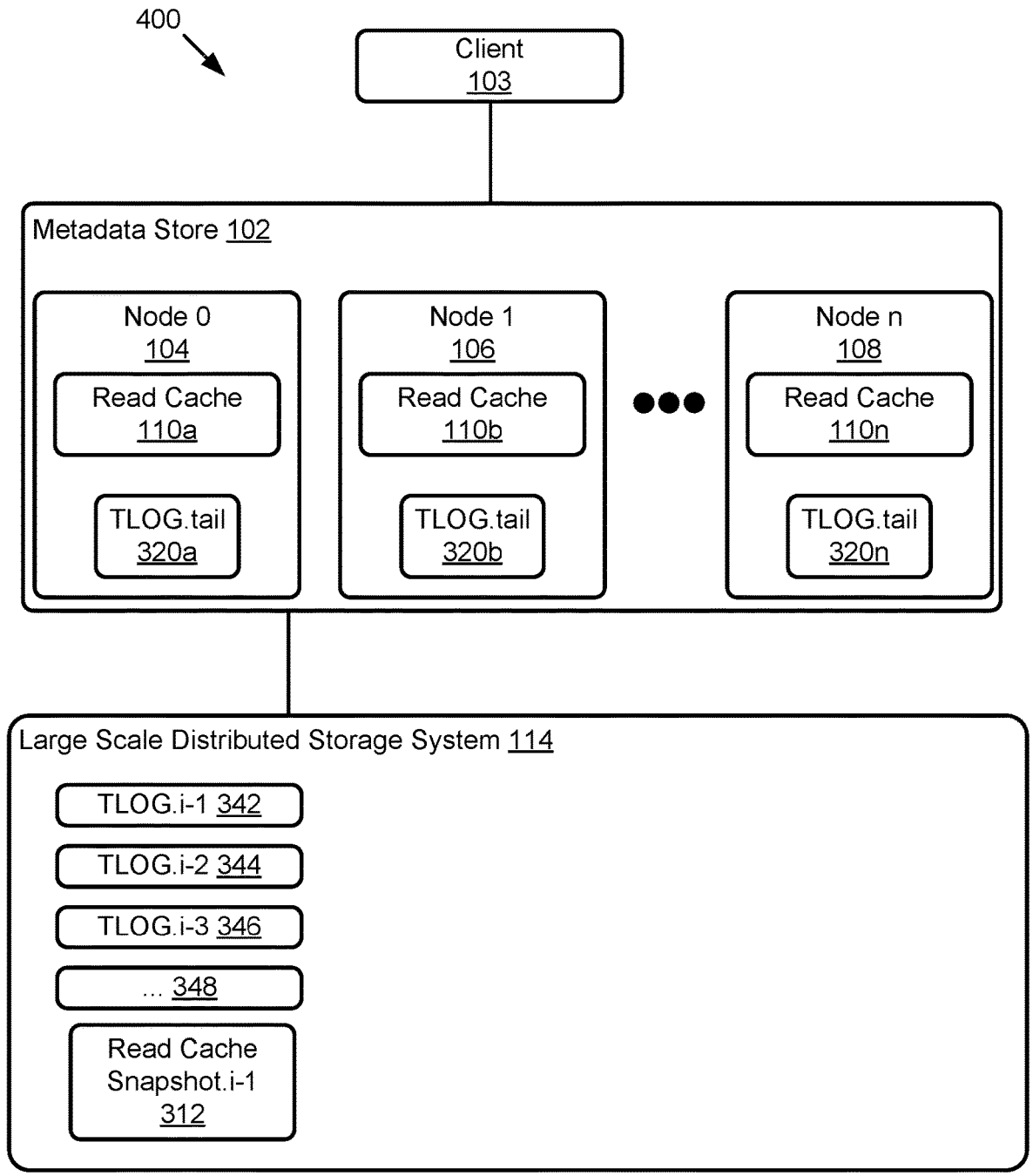
FIG. 4 is a block diagram illustrating an example of a multi-node metadata store with a read cache stored on local nodes and a transaction log stored on a distributed storage system.

FIG. 4 illustrates an example 400 of a multi-node metadata store with a read cache stored on local nodes and a transaction log stored on a distributed storage system. In this embodiment, the metadata store 102 comprises the read cache 110, and the large scale distributed storage system 114 comprises the TLOG entries TLOG.i-1 342, TLOG.i-2 344, TLOG.i-3 346, . . . , and Read Cache Sanpshot.i-1 312. The metadata store 102 comprises multiple local storage nodes 104, 106 and 108 storing multiple copies of a metadata read cache 110. In this embodiment, the entire TLOG 342-348 and Read Cache Snapshot.i-1 312 are stored in a large scale distributed storage system as objects 340.

Figure 5:
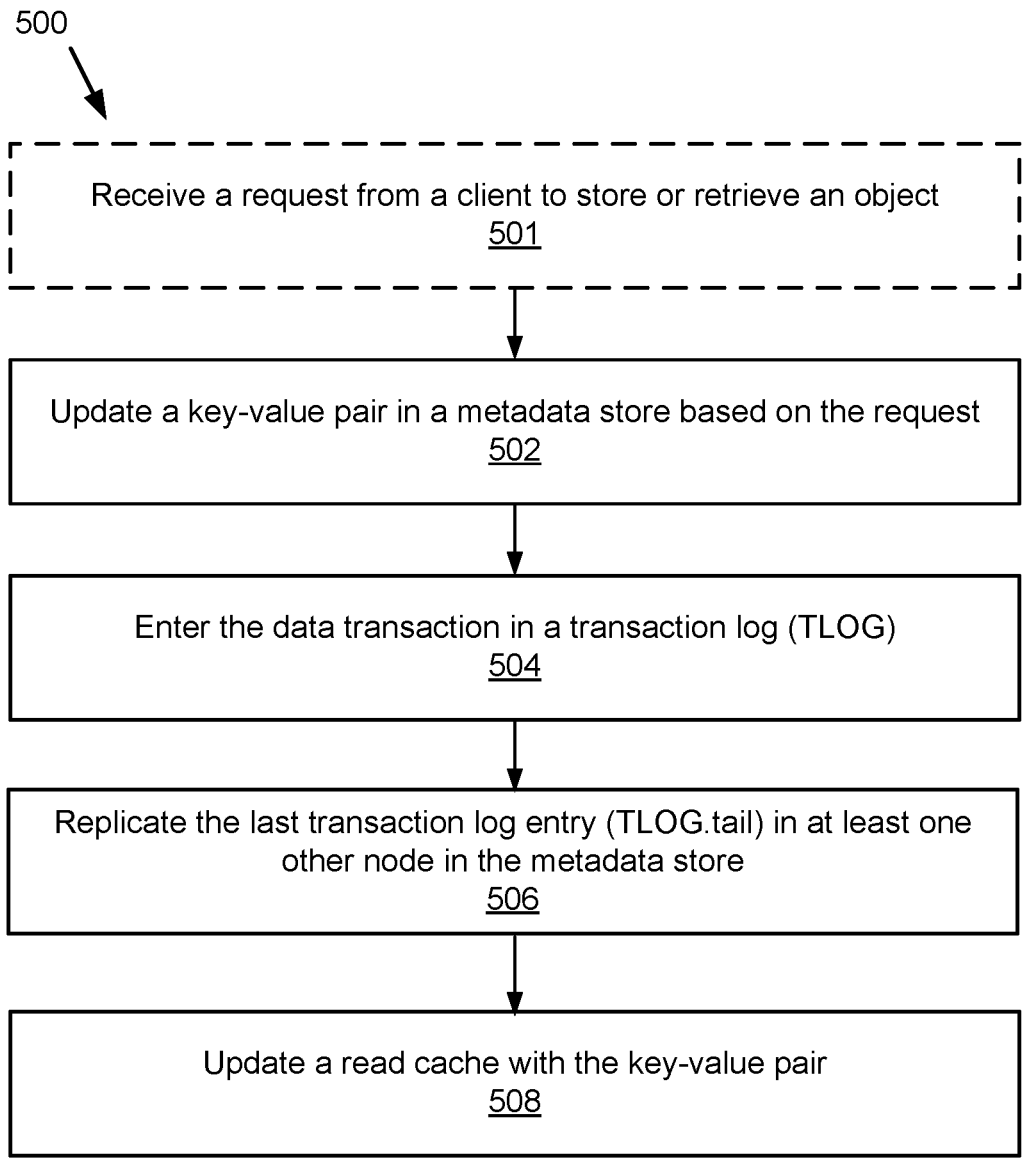
FIG. 5 is a block diagram illustrating an example of a metadata storage method.

FIG. 5 illustrates a method 500 for updating a metadata store according to some implementations of the present disclosure. At 501 the system receives a request from a client to store or retrieve a data object. The method may allow other operations on the data object, as well, such as updating or deleting the data object. The data object may be an object stored in the large scale distributed storage system 114 or a key-value pair in the metadata store 102. At 502 the system updates a key-value pair in a metadata store 102 based on the request. At 504 the system enters a record of the data transaction in a transaction log 112. In some embodiments, the transaction log 112 may be a linked list of transaction log entries. At 506 the system replicates the data transaction entered into the transaction log (TLOG.tail) in at least one other node in the metadata store. By having a copy of the data entries of the TLOG.tail across storage nodes, the system may be more robust, especially in situations where a storage node or device fails, and the data entries of the TLOG.tail are duplicated on another node and can be accessed and fully restored from that node. At 508 the system updates a read cache 110 with the key-value pair. In some embodiments, the read cache 110 represents the current state of the metadata store 102. In such embodiments, the read cache 110 may be recreated by "replaying" the transactions from the transaction log 112. The presence of a read cache 110 that represents the current state of the metadata store 102 allows for faster access to the metadata.

Figure 6:
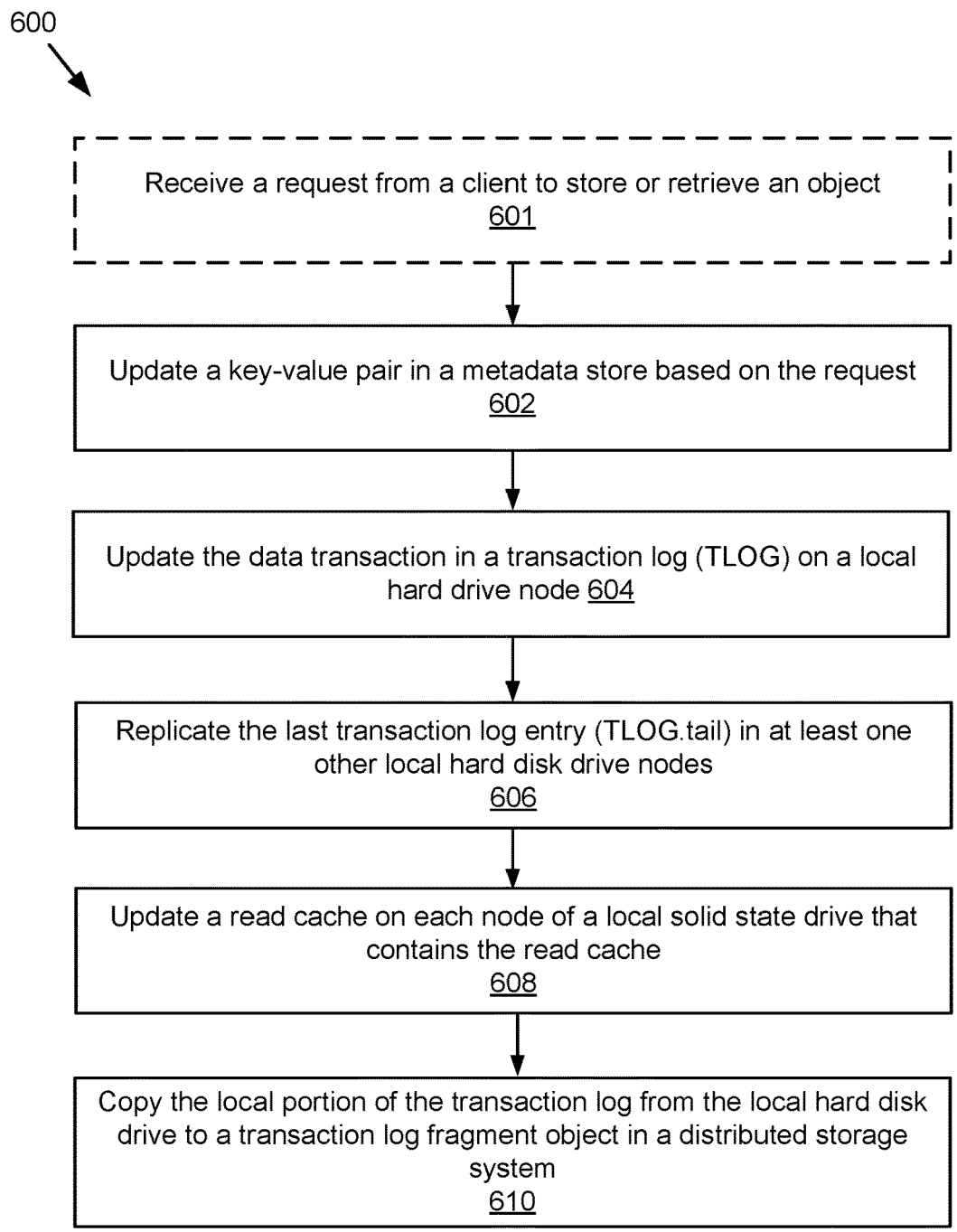
FIG. 6 is a block diagram illustrating an example of a metadata storage method with transaction log storage optimizations.

FIG. 6 illustrates a method 600 for updating a metadata store according to some implementations of the present disclosure. At 601 the system receives a request from a client to store, retrieve, update or delete an object. The object may be a large scale distributed storage system object or a key-value pair in the metadata store. At 602 the system updates a key-value pair in a metadata store based on the request. At 604 the system updates the data transaction in a transaction log (TLOG) on a local hard disk drive. Hard disk drives represent a fast, local storage device which may not be as fast as a solid-state drive, but may be more monetarily feasible. At 606 the system replicates the data transaction entered into the transaction log (TLOG.tail) in a least one other local hard disk drive node. There may be similar considerations in the storage strategy for the TLOG.tail as there are for the read cache, as mentioned previously, such as robustness by having duplicate versions, space savings by only duplicating the data entries of the TLOG.tail across some of the storage nodes, or storing a portion of the data entries of the TLOG.tail across multiple storage nodes such that the failure of a node leaves enough of the TLOG.tail intact on the remaining storage nodes. In some embodiments, other storage options may fill the role of the local hard disk drive storage. At 608 the system updates a read cache on each node of a local solid-state drive (in some embodiments) that contains the read cache. In other embodiments, other methods of fast, local storage may be used in place of solid-state drives. At 610 the system copies the local portion of the transaction log from the local hard disk drive to a transaction log fragment object in a distributed storage system. The distributed storage system may be distributed over multiple nodes and multiple physical site locations for ensuring robust data storage that is easily recoverable in the event of failure of one or more storage nodes, and even the inability to access some of the physical sites where the distributed storage system devices are located.

Figure 7:
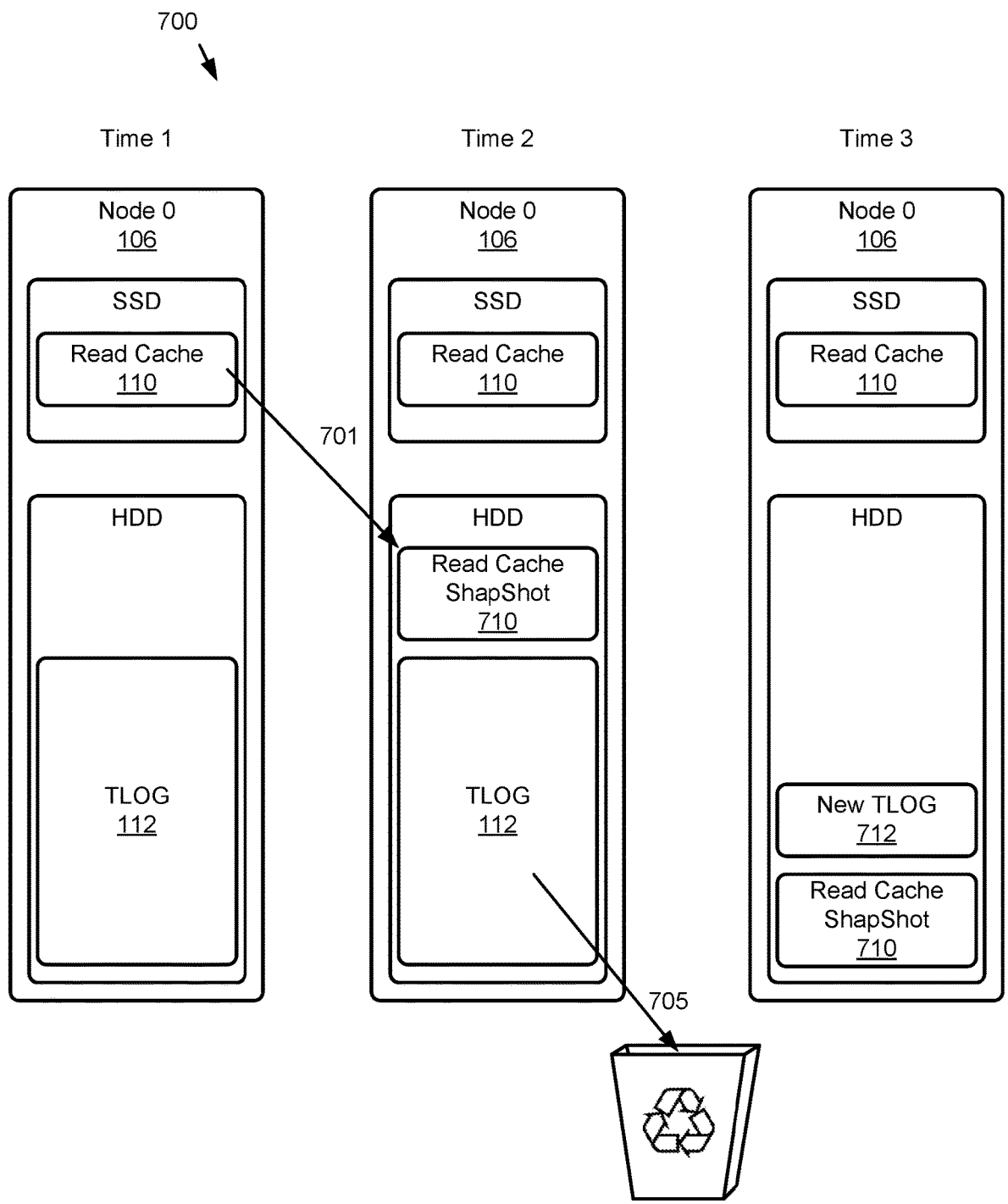
FIG. 7 is a block diagram illustrating an example of a metadata store using a read cache snapshot to reduce the size of the transaction log.

FIG. 7 illustrates an example 700 of a metadata store using a read cache snapshot to reduce the size of the transaction log. At "Time 1" the metadata store has a read cache 110 and a TLOG 112. The read cache 110 is copied 701 as a read cache snapshot 710 so that the current state of the read cache 110 (which incorporates all of the state represented by the TLOG 112) is captured in the read cache snapshot 710. Then, a short time later at "Time 2" the TLOG 112 is no longer needed since the current state of the read cache is captured in the read cache snapshot 710, and the TLOG 112 is deleted 705. Then, at "Time 3" the old TLOG 112 no longer exists, and the read cache snapshot 710 serves as the new baseline on which the new TLOG 712 can build, capturing the transactions that occur subsequent to creating the read cache snapshot 701. At this point in time, if the read cache 110 were lost, it could be rebuilt by starting with the read cache snapshot 710 as a baseline and replaying the new TLOG 712 on top of that baseline. This process should be much faster than replaying the entire TLOG 112 to regenerate the read cache 110. Additionally, since the read cache 112 can grow quite large over time, the process of creating 701 the read cache snapshot 710 and deleting 705 the potentially very large TLOG 112 can save a potentially very large amount of storage.

In the preceding description, for purposes of explanation, numerous specific details are set forth in order to provide a thorough understanding of the disclosure. It will be apparent, however, that the disclosure can be practiced without these specific details. In other instances, structures and devices have been shown in block diagram form in order to avoid obscuring the disclosure. For example, the present disclosure has been described in some implementations above with reference to user interfaces and particular hardware. However, the present disclosure applies to any type of computing device that can receive data and commands, and any devices providing services. Reference in the specification to "one implementation" or "an implementation" means that a particular feature, structure, or characteristic described in connection with the implementation is included in at least one implementation of the disclosure. The appearances of the phrase "in one implementation" or "in some implementations" in various places in the specification are not necessarily all referring to the same implementation.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other information storage, transmission or display devices.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Various general-purpose systems may be used with programs in accordance with the teachings herein, or it may prove convenient to construct more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

Finally, the foregoing description of the implementations of the present disclosure has been presented for the purposes of illustration and description. It is not intended to be exhaustive or to limit the present disclosure to the precise form disclosed. Many modifications and variations are possible in light of the above teaching. It is intended that the scope of the present disclosure be limited not by this detailed description, but rather by the claims of this application. As will be understood by those familiar with the art, the present disclosure may be embodied in other specific forms without departing from the spirit or essential characteristics thereof. Likewise, the particular naming and division of the modules, routines, features, attributes, methodologies and other aspects are not mandatory or significant, and the mechanisms that implement the present disclosure or its features may have different names, divisions and/or formats. Furthermore, the relevant art, the modules, routines, features, attributes, methodologies and other aspects of the present disclosure can be implemented as software, hardware, firmware or any combination of the three. Also, wherever a component, an example of which is a module, of the present disclosure is implemented as software, the component can be implemented as a standalone program, as part of a larger program, as a plurality of separate programs, as a statically or dynamically linked library, as a kernel loadable module, as a device driver, and/or in every and any other way known now or in the future in the art of computer programming. Additionally, the present disclosure is in no way limited to implementation in any specific programming language, or for any specific operating system or environment. Accordingly, the disclosure of the present disclosure is intended to be illustrative, but not limiting, of the scope of the present disclosure, which is set forth in the following claims.

What is claimed is:

1. A system comprising:
a distributed storage system; and
a metadata store configured to be coupled with the distributed storage system, the metadata store comprising:
   a processor;
   a memory;
   a plurality of data storage nodes, each data storage node comprising:
      a first data storage device configured to store a read cache and a first portion of a transaction log having a tail sequence of at least one transaction log entry, the read cache representing a current state of the metadata store and the current state of the metadata store being based on the transaction log; and
      a second data storage device configured to store a second portion of the transaction log; and
   a database manager stored on the memory and executable by the processor, the database manager configured to:
      receive a storage request from a client;
      create a transaction log entry based on the storage request;
      replicate the transaction log entry to the first portion of the transaction log on the first data storage device of each data storage node in the plurality of data storage nodes;
      in response to a first threshold event in association with the first portion of the transaction log, migrate the first portion of the transaction log from the first data storage device to the second data storage device of each data storage node in the plurality of data storage nodes; and
      in response to a second threshold event in association with the second portion of the transaction log:
         create a snapshot of the read cache;
         copy the snapshot of the read cache to the second data storage device of each data storage node in the plurality of data storage nodes;
         copy the second portion of the transaction log to a transaction log object in the distributed storage system after the second data storage device of each data storage node in the plurality of data storage nodes are in sync for the second portion of the transaction log; and delete the second portion of the transaction log from the second data storage device of each data storage node in the plurality of data storage nodes.

2. The system of claim 1, wherein the transaction log is a linked list of transaction log entries.

3. The system of claim 1 wherein, to replicate the transaction log entry, the database manager is further configured to:

store the transaction log entry in the first portion of the transaction log of a first data storage node; and update the first portion of the transaction log on a subset of the plurality of data storage nodes, wherein the subset of the plurality of data storage nodes comprises a majority of data storage nodes of the plurality of data storage nodes.

4. The system of claim 3, wherein the first portion of the transaction log is updated on the subset of the plurality of data storage nodes prior to the first portion of the transaction log entry being updated on remaining data storage nodes of the plurality of data storage nodes.

5. The system of claim 1, wherein the first data storage device comprises a solid-state drive.

6. The system of claim 1, wherein the second data storage device comprises a hard disk drive.

7. The system of claim 1, wherein the storage request comprises a request to store, retrieve, update, or delete a data object.

8. A method comprising:

receiving, at a first data storage node of a plurality of data storage nodes in a metadata store, a storage request from a client;

creating, on a first data storage device of the first data storage node, a transaction log entry based on the storage request, the first data storage device storing a read cache, the read cache representing a current state of the metadata store and the current state of the metadata store being based on a transaction log;

replicating the transaction log entry to a first portion of the transaction log stored on the first data storage device of each data storage node in the plurality of data storage nodes, the first portion of the transaction log having a tail sequence of at least one transaction log entry;

in response to a first threshold event in association with the first portion of the transaction log, migrating the first portion of the transaction log from the first data storage device to a second data storage device of each data storage node in the plurality of data storage nodes, the second data storage device storing a second portion of the transaction log; and in response to a second threshold event in association with the second portion of the transaction log:

creating a snapshot of the read cache;

copying the snapshot of the read cache to the second data storage device of each data storage node in the plurality of data storage nodes;

copying the second portion of the transaction log to a transaction log object in a distributed storage system after the second data storage device of each data storage node in the plurality of data storage nodes are in sync for the second portion of the transaction log; and deleting the second portion of the transaction log from the second data storage device of each data storage node in the plurality of data storage nodes.

9. The method of claim 8, wherein the transaction log is a linked list of transaction log entries.

10. The method of claim 8, wherein replicating the transaction log entry further comprises:

updating the first portion of the transaction log on a subset of the plurality of data storage nodes, wherein the subset of the plurality of data storage nodes comprises a majority of data storage nodes of the plurality of data storage nodes.

11. The method of claim 10, further comprising updating the first portion of the transaction log on the subset of the plurality of data storage nodes prior to updating the first portion of the transaction log entry on remaining data storage nodes of the plurality of data storage nodes.

12. The method of claim 8, wherein the first data storage device comprises a solid-state drive.

13. The method of claim 8, wherein the second data storage device comprises a hard disk drive.

14. The method of claim 8, wherein the storage request comprises a request to store, retrieve, update, or delete a data object.

15. A system comprising:

a distributed storage system; and a metadata store configured to be coupled to the distributed storage system, the metadata store comprising:

a processor;

a memory; and a database manager stored on the memory and executable by the processor, the database manager configured to:

receive, at a first data storage means of a plurality of data storage means in the metadata store, a storage request from a client;

create, on a first data storage device of the first data storage means, a transaction log entry based on the storage request, the first data storage device storing a read cache, the read cache representing a current state of the metadata store and the current state of the metadata store being based on a transaction log;

replicate the transaction log entry to a first portion of the transaction log stored on the first data storage device of each data storage means in the plurality of data storage means, the first portion of the transaction log having a tail sequence of at least one transaction log entry;

in response to a first threshold event in association with the first portion of the transaction log, migrate the first portion of the transaction log from the first data storage device to a second data storage device of each data storage means in the plurality of data storage means, the second data storage device storing a second portion of the transaction log; and in response to a second threshold event in association with the second portion of the transaction log:

create a snapshot of the read cache;

copy the snapshot of the read cache to the second data storage device of each data storage means in the plurality of data storage means;

copy the second portion of the transaction log to a transaction log object in a distributed storage system after the second data storage device of each data storage means in the plurality of data storage means are in sync for the second portion of the transaction log; and delete the second portion of the transaction log from the second data storage device of each data storage means in the plurality of data storage means.

16. The system of claim 15, wherein the transaction log is a linked list of transaction log entries.

17. The system of claim 15, wherein to replicate the transaction log entry, the database manager is further configured to:

update the first portion of the transaction log on a subset of the plurality of data storage means, wherein the subset of the plurality of data storage means comprises a majority of data storage means of the plurality of data storage means.

18. The system of claim 17, wherein the database manager is further configured to update the first portion of the transaction log on the subset of the plurality of data storage means prior to updating the first portion of the transaction log entry on remaining data storage means of the plurality of data storage means.

19. The system of claim 15, wherein the first data storage device comprises a solid-state drive.

20. The system of claim 15, wherein the second data storage device comprises a hard disk drive.

* * * * *